United States Patent
Lee

(10) Patent No.: US 7,651,772 B2
(45) Date of Patent: Jan. 26, 2010

(54) CORE-SHELL CARBON BLACK PELLETS AND METHOD OF FORMING SAME

(75) Inventor: Chang H. Lee, Harris County, TX (US)

(73) Assignee: Continental Carbon Company, Houston, TX (US)

( * ) Notice: Subject to any disclaimer, the term of this patent is extended or adjusted under 35 U.S.C. 154(b) by 183 days.

(21) Appl. No.: 11/700,794

(22) Filed: Jan. 31, 2007

(65) Prior Publication Data

US 2008/0182107 A1 Jul. 31, 2008

(51) Int. Cl.
*B32B 5/16* (2006.01)
(52) U.S. Cl. ...................... 428/403; 428/407
(58) Field of Classification Search ................. 428/403, 428/407
See application file for complete search history.

(56) References Cited

U.S. PATENT DOCUMENTS

| | | | |
|---|---|---|---|
| 2,850,403 A | 9/1958 | Day et al. | |
| 3,011,902 A | 12/1961 | Jordan et al. | |
| 4,569,834 A * | 2/1986 | West et al. | 423/449.2 |
| 5,168,012 A | 12/1992 | Watson et al. | |
| 5,461,098 A * | 10/1995 | Hitchcock et al. | 524/297 |
| 5,589,531 A | 12/1996 | Menashi et al. | |
| 5,654,357 A * | 8/1997 | Menashi et al. | 524/495 |
| 6,019,829 A * | 2/2000 | Omae et al. | 106/31.65 |
| 6,132,876 A * | 10/2000 | Vogler et al. | 428/408 |
| 7,148,285 B2 * | 12/2006 | Clark et al. | 524/495 |
| 2003/0144380 A1 * | 7/2003 | Clark et al. | 523/205 |

OTHER PUBLICATIONS

Osuji, et al. "Aggregation of Fractal Colloidal Carbon Black Particles" Division of Engineering and Applied Sciences Oct. 2005 http://people.deas.harvard.edu/~cosuji/colloidal_aggregation.html.

* cited by examiner

*Primary Examiner*—H. (Holly) T Le

(57) ABSTRACT

A carbon black pellet comprising an inner core of de-aerated carbon black and an outer surrounding shell of an encapsulating material, the shell of the encapsulating material having an average thickness of from about 1% to about 10% of the average thickness of the pellet.

9 Claims, No Drawings

CORE-SHELL CARBON BLACK PELLETS AND METHOD OF FORMING SAME

BACKGROUND OF THE INVENTION

1. Field of the Invention

The present invention relates to carbon black pellets and, more particularly, to carbon black pellets having good dispersibility, good bulk handling characteristics and good attrition resistance, and to a method of manufacturing such pellets.

2. Description of Prior Art

Carbon black finds wide industrial use. Carbon black is used as a reinforcing agent in rubber products such as tires, tubes, conveyor belts, cables and other mechanical rubber goods; as a black pigment in printing, lithographic, letter press, carbon paper and typewriter ribbon inks, paints, coatings, lacquers, plastics, fibers, ceramics, enamels, paper, record discs and photocopier toner; in leather finishes; in the manufacture of dry-cell batteries, electrodes and carbon brushes; in electrical conductors; in conductive and anti-static rubber and plastic products; for electromagnetic interference shielding; video discs and tapes; for UV stabilization of polyolefins; as a high temperature insulating material; etc.

As produced, carbon black particles have a fractal morphology. They are composed of primary particles about 10 to 500 nm in diameter which irreversibly fuse during the furnace/combustion process used and produce primary aggregates having a diameter of from 50 to 20,000 nm. Carbon black cannot be practically used in its produced form because of its light and dusty form making its handling, shipment and end use not only difficult but environmentally unacceptable. To improve these handling, shipping and use problems, the produced, fluffy carbon black is densified. It is well known in the art that for a given grade of carbon black, handling properties improve with increasing degree of densification. However, dispersibility of the densified carbon black is progressively degraded as the extent of densification is increased. Thus, there is a trade off between improvements in bulk handling properties and degradation in dispersibility.

In general, currently the industry uses three basic methods to obtain densification. These, in order of providing increased levels of densification are: agitation or vacuum treatment of the fluffy produced product, dry pelletization and wet pelletization. All of these methods are well documented in the art as disclosed, for example, in U.S. Pat. Nos. 2,850,403; 3,011,902; 4,569,834; 5,168,012; 5,589,531; and 5,654,357, all of which are incorporated herein by reference for all purposes. The densification processes mentioned above, all suffer from disadvantages, e.g., product that has poor properties in bulk handling, the formation of pellets which are relatively weak and have poor attrition resistance or relatively dense, hard and attrition resistant pellets which possess good bulk handling properties but are difficult to disperse.

Thus there still remains a need for a densified carbon black which exhibits good bulk handling properties, has good attrition resistance and is readily dispersible.

SUMMARY OF THE INVENTION

In one aspect the present invention provides a carbon black pellet comprising an inner core of de-aerated carbon black and an outer, surrounding shell of an encapsulating material, the shell of encapsulating material having an average thickness of from about 1% to about 10% of the average thickness of the pellet.

In another aspect of the present invention, there is provided a method for producing encapsulated carbon black pellets wherein de-aerated carbon black is contacted with a fluidized encapsulating material in a fluid-solids contactor for a period of time sufficient to form a carbon black pellet as described above.

DETAILED DESCRIPTION OF PREFERRED EMBODIMENTS

Virtually any carbon black can be used in the process of the present invention. Thus, carbon blacks produced by various industrial processes including acetylene black, channel black, furnace black, lamp black and thermal black can be employed. Preferred carbon blacks used in forming the pellets of the present invention, include carbon black in the $I_2NO$(ASTM D1510) range of 20 g/Kg to 1000 g/Kg and OAN(ASTM D2414) range of 45 ml/100 g to 500 ml/100 g.

The carbon black pellets of the present invention are characterized by a soft or fluffy carbon black inner core and an outer, surrounding shell of an encapsulating material which forms a rigid to semi-rigid coating which resists attrition and physical impact to thereby render the pellets more dust free. While the pellets produced according to the present invention can vary in shape and size, generally speaking for the most part the pellets are of a spherical or spherical-like shape and have a diameter of from 125 to 2000 μm. However, as noted, the pellets may not necessarily be spherical and the size range can vary substantially over that noted above. The outer, encapsulating shell, whether it be termed a crust, film, layer or the like, will generally have an average thickness of from about 1% to about 10% of the average thickness of the carbon black pellet. It will be understood that in cases where the pellets are asymmetric, e.g., not spherical or generally spherical, that this average thickness of the outer surrounding layer will still hold true. In this regard, the volume of the inner core of the pellet relative to the volume of the encapsulating layer will be such that if the pellet, albeit irregular in shape were spherical in nature, the combined volumes of the inner core and the encapsulating layer, viewed as a generally spherical body would be such that the above relationship held true, i.e., the average thickness of the encapsulating layer is from about 1% to about 10% of the thickness, e.g., diameter, of the overall pellet.

From a compositional perspective, it is desired that the encapsulating shell be as thin as possible consistent with the pellets having adequate bulk handling properties. In general, the shell of the pellets of the present invention will contain a maximum amount of 10 wt. % of encapsulating material based on the total weight of the carbon black present in the pellet. In cases where the encapsulating material comprises a single encapsulating agent, the weight of the encapsulating agent will generally be from about 1 to about 3 wt. % based on the total carbon black present in the pellet while in cases where multiple encapsulating agents are employed, the weight of the encapsulating material will be from about 5 to about 7 wt. % based on the total carbon black present in the pellet. While some of the encapsulating material will be present in the core of the pellet, at least 30 wt. %, preferably more than 50 wt. %, and more preferably 90 wt. % or more of the total encapsulating material employed will be present in the outer, surrounding shell of the pellet. Because of the unique construction of the pellet of the present invention, i.e., a soft, fluffy inner core of carbon black and an outer more rigid shell, crust or layer of encapsulating material, relatively small amounts of encapsulating material(s), can be employed, since the encapsulating material is concentrated in the outer surrounding shell of the pellet.

The encapsulating material used in the process of the present invention, as noted above, can comprise a single encapsulating agent or multiple encapsulating agents. Encapsulating agents are well known to those skilled in the art and include numerous materials. Thus, non-limiting examples of encapsulating materials include carbohydrates, lignin oxides, cellulose by-products, natural rubbers, synthetic rubbers, synthetic polymers, natural and synthetic waxes, resins, rosins, and mixtures thereof. The encapsulating material whether it be one encapsulating agent or multiple encapsulating agents will be in particulate form. In certain cases, this can be accomplished by melting the encapsulating material and forming it into a mist, spray, aerosol or other particulate form. In still other cases, the encapsulating material can be dissolved in a suitable carrier which can then be formed into a mist, spray, aerosol or the like. The term carrier as used herein is intended to mean any fluid, e.g., a liquid, in which the encapsulating agent or agents can be dissolved, dispersed or otherwise formed into a particulate form such that it can be introduced into a fluid-solids contactor in the form of an aerosol, mist, spray or other particulate form. Non-limiting examples of liquid carriers include mineral oils, animal oil, plant oils, alcohols, and acids. In certain cases, the encapsulating material can be in the form of an aerosol of finely divided solid particles, which at the temperature of the encapsulating step will coalesce to form the shell. In this case, the finely divided solid particles would simply be introduced into the encapsulated step by being carried in a gaseous stream, e.g., air or an inert gas, if desired. In any event, the encapsulating agent will be of a type which can form a crust, coating, film, covering, etc., on the carbon black to form the encapsulating shell.

While the shell has been described as "surrounding the core of the pellet," it is to be understood that there could be minor fissures or discontinuities in the shell such that the inner core was exposed, albeit slight. However, any such fissures or discontinuities in the encapsulating shell will be of such a dimension that there is no substantial escape of the core material from the pellet.

In forming the carbon black pellets of the present invention, two main steps are employed—de-aerating and encapsulating. As is well known, produced carbon black is extremely fluffy with a low apparent density. The fluffiness of the produced carbon black can be to some extent reduced and the apparent density increased by de-aerating the produced carbon black per methods well known to those skilled in the art. For example, carbon black de-aeration can be accomplished by using equipment such as vacuum filtration and/or compactors all of which are commercially available and commonly used for the purpose of removing air from produced, fluffy carbon black.

The terms fluid, fluids and derivatives thereof, as used herein with respect to the fluid/solids contactor means a physical form such as a spray, aerosol, mist, dust or the like, wherein particulate matter, whether in solid or liquid form, is suspended in a generally gaseous environment. The de-aerated carbon black is introduced into a fluid-solids contactor. The fluid-solids contactor can comprise a moving bed system such as a rotary drum, with or without pins, or a fluidized bed system or for that matter any type of equipment wherein solid particles, e.g., the de-aerated carbon black can be contacted with a fluid, as defined above, of the encapsulating material such that the fluid ultimately forms a shell around an agglomeration of the carbon black to thereby form the carbon black pellets of the present invention. The contacting between the de-aerated carbon black and the fluidized particulate encapsulating material is conducted for a period of time sufficient to accomplish the pelletizing process, i.e., to form an inner core of carbon black and an outer shell or crust of encapsulating material. It will be understood that the time for forming the pellets can vary over wide limits depending upon the nature of the carbon black, the nature of the encapsulating material, etc.

The encapsulation process can be carried out at ambient or elevated temperatures of from 10 to 200° C. depending on the nature of the encapsulating material. For example, in cases where the encapsulating material is in the form of a wax which can be melted to form a mist, dispersion or other particulate form of the wax, the temperature may range from 60 to 160° C. depending upon the particular wax employed. It needs to be understood that the wax as contemplated herein can be either natural or synthetic. In cases where the encapsulating material is dissolved in a carrier, temperatures can be considerably lower than would be employed in the case of a relatively high temperature melting wax and need only be high enough to evaporate the carrier leaving the encapsulating material to form the shell on the carbon black core.

Once the encapsulation process has been finished and the pellets formed, they are removed from the contactor and cooled if necessary. In certain cases, again depending upon the nature of the encapsulating material, the cooling step is not required. However, in cases where relatively high temperatures are employed in the encapsulation process, it may be necessary to remove the pellets and cool them by methods well known to those skilled in the art. A feature of the present invention is that because a relatively small amount of the encapsulating material is employed, the encapsulating material tends to solidify or harden very quickly to form the shell minimizing the need for cooling in many cases.

To more fully illustrate the present invention, the following non-limiting examples are presented.

EXAMPLE 1

A 6000 pound charge of de-aerated N650 (ASTM D1765) carbon black was wet pelletized with 6000 pounds of water and 0.5 wt. % molasses binder based on the total weight of carbon black, in a commercial pin mixer at 100° C. for 10 minutes, to form control sample pellets.

EXAMPLE 2

De-aerated carbon black from fluffy N650 (ASTM D1765) was wet pelletized with water but without any binder. Thus, the pellets produced were as per Example 1 but without any molasses binder. Fifty pounds of the pellets were introduced into a Munson Rotary Batch Mixer which had a bladed interior to keep the pellets in motion. Polyethylene wax was heated to a temperature of around 90° C., i.e., to the melting point, and sprayed into the rotating drum, the interior of the drum being substantially at ambient temperature. The amount of polyethylene wax employed was 1.7 wt. % based on the weight of the carbon black charged to the drum. The encapsulation process was continued for a period of approximately 2 minutes at which point the pellets were removed.

EXAMPLE 3

The procedure of Example 2 was followed with the exception that the encapsulating agent comprised a phenolic resin which had been melted and dispersed or suspended in paraffinic mineral oil as a carrier. The phenolic resin was present in an amount of 1.5 wt. % based on the carbon black charge while the paraffinic mineral oil was present in an amount of 4.8 wt. % based on the carbon black charge.

The pellets made per Examples 1, 2 and 3, were subjected to various tests to determine dust generation, attrition resistance and dispersibility. To determine dust generation, two methods were employed—visual inspection and a modified ASTM D1508 test (Test time increased from 20 minutes to 60 minutes). The visual inspection method involved placing a half gallon of the carbon pellets in a container, agitating the pellets in the container with gloved hands 10 times and determining visually the amount of carbon black on the gloves. In the modified ASTM D1508 method, the pellets were subjected to a 60 minute test to simulate long distance shipment of the pellets to determine attrition resistance and dust generation.

Table 1 shows the results of the two dust generation/attrition tests as well as individual pellet crush strength (ASTM D3313). In the results in Table 1 below, the pellet of Example 1 is arbitrarily assigned a value of 100 for the modified ASTM D1508 test and the ASTM D3313 test. With respect to the visual inspection method of determining dust generation by the pellets, an arbitrary scale of 1-5 was employed with 5 being worst and 1 being best. The results are shown in Table 1 below. As can be seen from Table 1, the pellets made by the process of the present invention Examples 2 and 3 (Ex 2, Ex. 3) generated much less dust albeit that they had less pellet rigidity or crush strength versus the prior art pellet, e.g., the pellet made per Example 1 (Ex. 1).

TABLE 1

| Test | Ex 1 | Ex 2 | Ex 3 |
|---|---|---|---|
| Modified ASTM D1508 (Attrition) | 100 | 60 | 17 |
| % Improvement, % vs. Ex 1 | | 40 | 83 |
| Visual Inspection (Dustiness) | 5 | 3 | 1 |
| % Improvement, % vs. Ex 1 | | 40 | 80 |
| ASTM D3313 (Pellet strength) | 100 | 49 | 72 |

The pellets of Examples 1-3 were compounded in a 1.5 liter internal mixer with various amounts of rubber components and other additives for purposes of conducting dispersibility testing. For further comparison purposes, two additional formulations, Compound 2 and Compound 3, were also used. Compounds 2 and 3 have the same type and amount of encapsulating materials that were used to form the pellets of the Ex. 2 and 3. However, the pellets of Compounds 2 and 3 were made the same as Ex 1. The compound of Examples 1-3 and Compounds 2 and 3 were then formed into rubber-containing compositions for determination of dispersibility. The compositions of the pellet-rubber formulations are shown in Table 2 below wherein all components are parts-per-hundred of rubber (PHR).

TABLE 2

| Test | Ex 1 | Ex 2 | Ex 3 | Compound 2 | Compound 3 |
|---|---|---|---|---|---|
| Molasses Binder | Yes | No | No | Yes | Yes |
| 1st Stage, 1.5 L Banbury Mixer | | | | | |
| SBR[1] | 75.00 | 75.00 | 75.00 | 75.00 | 75.00 |
| BR[2] | 25.00 | 25.00 | 25.00 | 25.00 | 25.00 |
| Ex 1 Wet Pellet N650 | 72.00 | | | 72.00 | 72.00 |
| Ex 2 Encapsulated N650 | | 73.25 | | | |
| Ex 3 Encapsulated N650 | | | 76.52 | | |
| PE wax | | | | 1.25 | |
| Phenolic resin | | | | | 1.07 |
| Paraffinic oil | | | | | 3.45 |
| Additives 1* | 38.00 | 38.00 | 38.00 | 38.00 | 38.00 |
| 2nd Stage, 2-roll mill | | | | | |
| 1st stage lump | 210.00 | 211.25 | 214.52 | 211.25 | 214.52 |
| Additives 2** | 3.50 | 3.50 | 3.50 | 3.50 | 3.50 |
| Total | 213.50 | 214.75 | 218.02 | 214.75 | 218.02 |

[1]Styrene-Butadiene rubber sold under the name SOLFLEX ®
[2]Butadiene rubber sold under the name BUDENE ®
*"Additives 1" comprises plasticizers, antioxidants, and antiozonants
**"Additives 2" comprise curing agents The dispersibility of the pellets of Examples 1-3 and Compounds 2 and 3 were evaluated by two methods—optical inspection for micro-dispersion and extrusion tests for macro-dispersion. In the optical evaluation, no significant differences were observed. In determining macro-dispersion, a lab extruder (single screw of 0.75 inch O.D., 10:1 L/D ratio, and 0.75 inch channel depth) with screen packs of U.S. No. 325 and No. 60 at the end of the screw barrel was employed. Operating conditions were 45 rpm screw speed, 110° C. die temperature and 70° C. barrel temperature. The results are shown in Table 3 using two indices (1) the average pressure buildup in the extruder barrel per unit volume of compound extruded and (2) elapsed time for the pressure build-up in the extruder barrel to reach a given pressure of 5200 PSI. Example 1 was assigned an arbitrary value of 100. The results are shown in Table 3.

TABLE 3

| Test | Ex 1 | Ex 2 | Ex 3 | Compound 2 | Compound 3 |
|---|---|---|---|---|---|
| Pressure build-up | 100 | 58 | 64 | 94 | 92 |
| % Improvement, % vs. Ex 1 | | 42 | 36 | 6 | 8 |
| Elapsed time | 100 | 490 | 450 | 100 | 110 |
| % Improvement, % vs. Ex 1 | | 390 | 350 | 0 | 10 |

As can be seen from the results in Table 3, there was much less pressure build-up in the encapsulated pellets according to the present invention (Examples 2 and 3) as compared with the control (Example 1) and Compounds 2 and 3. As can also be seen, the elapsed time to reach the 5200 PSI pressure build-up in the extruder barrel was much greater for the encapsulated pellets of the present invention (Examples 2 and 3) as compared to the control (Example 1) or Compounds 2 and 3. Thus it can be seen from the data in Table 3 that the encapsulated pellets of the present invention are more readily dispersible than a prior art wet pelletized carbon black pellet using a carbohydrate (molasses) binder or prior art pellets such as Compounds 2 and 3. It is well known that the dispersibility of carbon black pellets in a polymeric matrix such as that employed in Examples 1-3 and Compounds 2 and 3, is reflected by the two indices evaluated, i.e., pressure build-up and elapsed time for pressure build-up in the extruder barrel. In this regard, the former represents extrusion rate while the latter represents extrusion energy. As can be seen from Table 3, the extrusion rate was higher for the encapsulated pellets of the present invention and extrusion energy was lower for the encapsulated pellets of the present invention.

EXAMPLE 4

The procedure of Example 1 was followed to form wet pelletized pellets of carbon black, N650 using molasses as a binder.

EXAMPLE 5

This example demonstrates production of the encapsulated pellets of the present invention in a continuous process. Pellets produced per Example 4 but without any binder were introduced at a rate of 1000 PPH (pounds per hour) into a Munson Rotary Continuous Blender. An encapsulating material comprising 1.2 wt. % phenolic resin suspended in 3.6 wt. % paraffinic mineral oil, both based on the carbon black weight, was introduced into the Munson Rotary Continuous Blender by spraying. The temperature in the Munson Rotary Continuous Blender was 35° C.

EXAMPLE 6

The procedure of Example 1 was followed with the exception that the carbon black employed was N339 (ASTM D1765) and the binder was lignin oxide.

EXAMPLE 7

The procedure of Example 5 was followed with the exception that the pellets employed were those produced per Example 6 but without any binder and the encapsulating material comprised 2.6 wt. % polyethylene wax dispersed in 2.3 wt. % paraffinic mineral oil, both based on the carbon black weight. The encapsulating material, i.e., the mixture of polyethylene wax suspended in the paraffinic mineral oil, was introduced as a mist into the Munson Rotary Continuous Blender at a temperature of 35° C.

The pellets of Examples 4 and 5 were compared to determine the effect of sieve residue on dispersibility. For example, as can be seen from Table 4 below, the encapsulated pellets according to the present invention (Example 5) had 8 times more sieve residue as the prior art pellets (Example 4). It can be speculated that pellets of lower sieve residue (U.S. No. 325 screen) would cause less average pressure build-up in the barrel of an extruder using a U.S. No. 325 screen. The results are shown in Table 4. Also shown in Table 4, as to the pellets of Examples 4 and 5, is a dust generator test which was performed in two ways—visual inspection and a modified ASTM D1508 as described above with respect to Examples 1-3. Table 4 shows the results of the dust generation test as well as indices pellet crush strength (ASTM D3313), pellet size distribution (ASTM D1511) and sieve residue (ASTM D1514-U.S. No. 325 screen).

TABLE 4

| Test | | Ex 4 | Ex 5 |
|---|---|---|---|
| Modified ASTM D1508 (Attrition) | | 100 | 17 |
| % Improvement, % vs. Ex 4 | | | 83 |
| Visual Inspection (Dustiness) | | 5 | 1 |
| % Improvement, % vs. Ex 4 | | | 80 |
| ASTM D3313 (Pellet Strength) | | 100 | 77 |
| Sieve residue #325 | | 100 | 843 |
| Pellet Size Distribution, % | #10 | 2.2 | 1.8 |
| | #18 | 31.7 | 44.0 |
| | #35 | 47.9 | 41.5 |
| | #60 | 14.2 | 10.5 |
| | #120 | 2.8 | 2.0 |
| | Pan | 1.2 | 0.2 |

The pellets produced per Examples 4-7 were subjected to the procedure set forth with respect to Examples 1-3 and as set forth in Table 2. The same styrene butadiene rubber and butadiene rubber were employed in the formations using the pellets of Examples 4-7. Examples 4-1 and 6-1 are the pellets produced per Examples 4 and 6 but blended with the binders used to produce the pellets of Examples 5 and 7, respectively, to form generally homogeneous pellets wherein the binder was dispersed throughout the pellet rather than forming encapsulating pellets as per Examples 5 and 7. The rubber formulations are shown in Table 5 below.

TABLE 5

| Test | Ex 4-1 | Ex 5 | Ex 6-1 | Ex 7 |
|---|---|---|---|---|
| Molasses Binder | Yes | No | No | No |
| Lignin Oxide Binder | No | No | Yes | No |
| 1$^{st}$ Stage, 1.5 L Mixer | | | | |
| SBR | 75.00 | 75.00 | 75.00 | 75.00 |
| BR | 25.00 | 25.00 | 25.00 | 25.00 |
| Ex 4 Wet-pellet N650 | 72.00 | | | |
| Ex 6 Wet-pellet N339 | | | 72.00 | |
| Ex 5 Encapsulated N650 | | 75.48 | | |
| Ex 7 Encapsulated N339 | | | | 75.52 |
| PE wax | | | 1.87 | |
| Phenolic resin | 0.88 | | | |
| Paraffinic oil | 2.60 | | 1.65 | |
| Additives 1* | 39.50 | 39.50 | 39.50 | 38.00 |
| 2$^{nd}$ Stage, 2-roll mill | | | | |
| 1$^{st}$ stage lump | 214.98 | 214.98 | 215.02 | 215.02 |
| Additives 2** | 3.50 | 3.50 | 3.50 | 3.50 |
| Total | 218.48 | 218.48 | 218.52 | 218.52 |

*"Additives 1" comprises plasticizers, antioxidants, and antiozonants
**"Additives 2" comprise curing agents Dispersibility of the pellets of Examples 4-1, 5, 6-1 and 7, was evaluated by an extrusion test. The pellets were extruded in a Haake® lab extruder (single screw of 0.75 inch O.D., 10:1 L/D ratio, and 0.75 inch channel depth) with the screen packs of U.S. Pat. No. 325 and U.S. Pat. No. 6-0 at the end of the screw barrel. Operating conditions were 45 rpm screw speed, 110° C. die temperature and 70° C. barrel temperature. Dispersibility was described in terms of the average pressure build-up in the extruder barrel per unit volume of compound extruded and elapsed time for the pressure build-up in the extruder barrel to reach a given pressure, in this case 5200 PSI for the pellets of Examples 4-1 and 5 and 4000 PSI for the pellets of Examples 6-1 and 7. The results for Examples 4 and 5 are shown in Table 6.

TABLE 6

| Test | Ex 4-1 | Ex 5 |
|---|---|---|
| Pressure build-up | 100 | 86 |
| % Improvement, % vs. Ex 4-1 | | 14 |
| Elapsed time | 100 | 154 |
| % Improvement, % vs. Ex 4-1 | | 54 |

Although the pellets of Example 5 contain 8 times more sieve residue (U.S. Pat. No. 325 mesh) than the pellets of Examples 4-1, nonetheless, as can be seen from the data in Table 6, the encapsulated pellets of Example 5 showed much slower pressure build-up in the extrusion test. These results demonstrate that macro-dispersion is independent of sieve residue amount to a certain extent and that the encapsulated pellets of Example 5 disperse more quickly and to smaller sizes which ultimately contributes to an improvement in extrusion productivity and reduces manufacturing costs. Similar results were exhibited with the pellets of Examples 6-1 and 7 as shown in Table 7 below.

TABLE 7

| Test | Ex 6-1 | Ex 7 |
|---|---|---|
| Pressure build-up | 100 | 71 |
| % Improvement, % vs. Ex 6-1 | | 29 |
| Elapsed time | 100 | 144 |
| % Improvement, % vs. Ex 6-1 | | 44 |

Table 7 also demonstrates that the enhanced benefits of the encapsulated pellets are not dependent upon a specific grade of carbon black since the pellets of Examples 6-1 and 7 were made from a different carbon black than the pellets of Examples 4-1 and 5.

Pellets of Examples 6-1 and Example 7 were also tested in silica blend formulations to determine if the encapsulated pellets (Example 7) could reduce manufacturing costs or increased dispersibility in a multiple mixing system as well as in a single mixing system as per the results obtained and shown in Table 7. In this respect, it is well known that silica is difficult to disperse compared to carbon black. Accordingly, multiple pass mixing or dynamic mixing methods are imperative to obtain a satisfactory dispersion of the silica which increases manufacturing costs and reduces productivity. The formulations are shown in Table 8 below. In Table 8, all amounts are in PHR unless other indicated.

TABLE 8

| Test | Ex 6-2 | Ex 7-1 |
|---|---|---|
| Lignin Oxide Binder | Yes | No |
| $1^{st}$ to $3^{rd}$ Stage, 1.5 L Mixer | | |
| SBR | 103.12 | 103.12 |
| BR | 25.00 | 25.00 |
| Ex 6 Wet-pellet N339 | 36.00 | |
| Ex 7 Encapsulated N339 | | 38.00 |
| PE wax | 1.5 | 0.5 |
| Aromatic oil | 4.38 | 3.38 |
| Micro-pearl Silica | 40.00 | 40.00 |
| Additives 1* | 11.90 | 11.90 |

TABLE 8-continued

| Test | Ex 6-2 | Ex 7-1 |
|---|---|---|
| Final Stage, 1.5 L mixer | | |
| $3^{rd}$ stage lump | 221.90 | 221.90 |
| Additives 2** | 5.30 | 5.30 |
| Total | 227.2 | 227.2 |

*"Additives 1" comprise plasticizers, silica coupling agents, antioxidants, and antiozonants.
**"Additives 2" comprise curing agents

EXAMPLE 8

The dispersibility was evaluated through extrusion tests. Formulations from Table 8 were extruded in the lab extruder (single screw of 0.75 inch O.D., 10:1 L/D ratio, and 0.75 inch channel depth) with the screen packs of U.S. No. 200 and No. 35 at the end of the screw barrel under operating conditions of 45 RPM screw speed, 70° C. die temperature and 70° C. barrel temperature. Dispersibility was determined by average pressure build-up in the extruder barrel per unit volume of compound extruded and elapsed time for pressure build-up in the extruder barrel to reach a given pressure (5200 PSI). The results are shown in Table 9 below.

TABLE 9

| Test | Ex 6-2 | Ex 7-1 |
|---|---|---|
| Pressure build-up | 100 | 86 |
| % Improvement % vs. Ex 6-2 | | 14 |
| Elapsed time | 100 | 131 |
| % Improvement % vs. Ex 6-2 | | 31 |

As can be seen from Table 9, the encapsulated pellets (Example 7), showed significant improvement over dispersibility in a multiple pass mixing of a silica blend formulation as compared with pellets of Example 6-1 wherein the binders were generally homogeneously mixed throughout the pellets.

The data above demonstrates that the encapsulated pellets of the present invention show reduced attrition (less dusting) and better dispersibility as compared with prior art pellets made by a wet pelletizing method regardless of binder types employed and amounts, carbon black types or grades, and formulations and/or methods of mixing.

The foregoing description and examples illustrate selected embodiments of the present invention. In light thereof, variations and modifications will be suggested to one skilled in the art, all of which are in the spirit and purview of this invention.

What is claimed is:

1. A dispersible carbon black pellet comprising an inner core of carbon black aggregates and an outer surrounding shell of an encapsulating material, said shell having an average thickness of from about 1% to about 10% of the average thickness of said pellet wherein the encapsulating material in said shell comprises at least 50 wt. % of the total encapsulating material present in said pellet.

2. The pellet of claim 1, wherein said encapsulating material is present in said pellet at a maximum amount of about 10 wt. % based on the total carbon black present in said pellet.

3. The pellet of claim 1, wherein the encapsulating material in said shell comprises at least 90 wt. % of the total encapsulating material present in said pellet.

4. The pellet of claim 1, wherein an encapsulating material comprises a single encapsulating agent.

5. The pellet of claim 1, wherein said encapsulating material comprises multiple encapsulating agents.

6. The pellet of claim 1, wherein said Carbon black aggregates are selected from the carbon black group consisting of $I_2N0$(ASTM D1510) in the 20 g/Kg to 1000/Kg range and OAN (ASTM D2414) in the 45 ml/100 g to 500 ml/100 g range.

7. The pellet of claim 1, wherein said carbon black pellet is generally spherical.

8. The pellet of claim 7, wherein said spherical pellet has a diameter of from 125 to 2000 μm.

9. The pellet of claim 1, wherein said encapsulating material is selected from the group consisting of carbohydrates, lignin oxides, cellulose by-products, natural rubbers, synthetic rubbers, synthetic polymers, waxes, resins, rosins, and mixtures thereof.

* * * * *